F. W. WIEMAN.
SELF CLEANING RAKE.
APPLICATION FILED MAY 14, 1909.
941,292.
Patented Nov. 23, 1909.
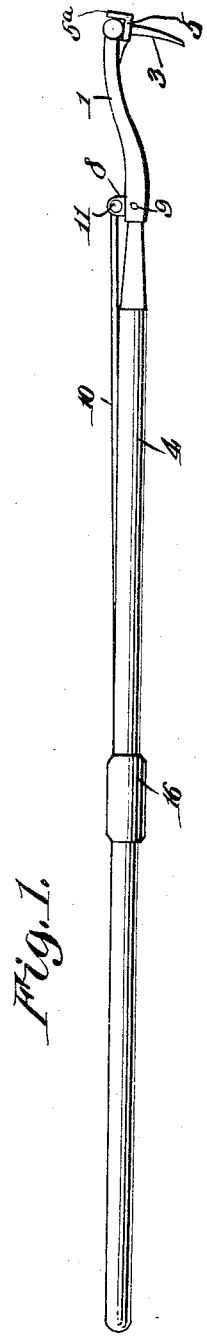
Fig. 1.
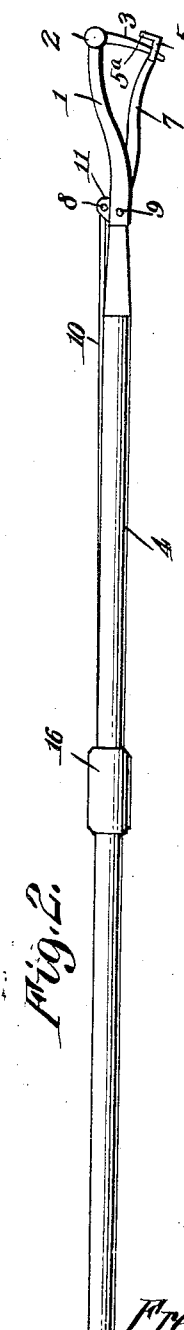
Fig. 2.
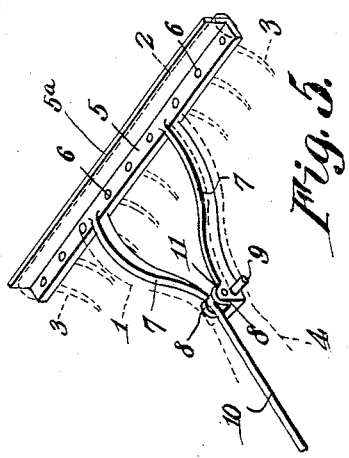
Fig. 5.
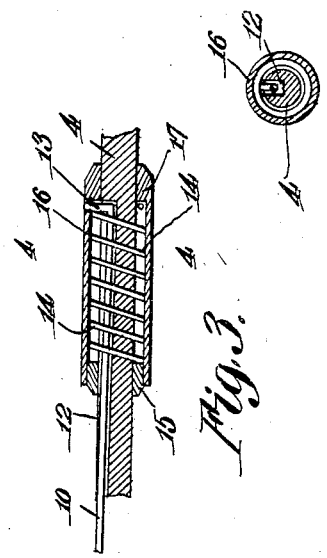
Fig. 3.
Fig. 4.
Witnesses
Frederick W. Wieman, Inventor
By Victor J. Evans, Attorney

UNITED STATES PATENT OFFICE.

FREDERICK WILLIAM WIEMAN, OF LAWRENCE, KANSAS.

SELF-CLEANING RAKE.

941,292.  Specification of Letters Patent.  Patented Nov. 23, 1909.

Application filed May 14, 1909. Serial No. 495,865.

*To all whom it may concern:*

Be it known that I, FREDERICK WILLIAM WIEMAN, a citizen of the United States of America, residing at Lawrence, in the county of Douglas and State of Kansas, have invented new and useful Improvements in Self-Cleaning Rakes, of which the following is a specification.

This invention relates to self-cleaning rakes, and one of the principal objects of the same is to provide a rake having curved teeth and a cleaner plate provided with perforations and adapted to be moved over the teeth to strip the leaves or other material from said teeth.

Another object of the invention is to provide a rake having a perforated cleaner plate for the teeth of the rake and a sliding sleeve mounted on the handle of the rake for operating the cleaner plate at each forward movement of the rake.

These and other objects may be attained by means of the construction illustrated in the accompanying drawing, in which,—

Figure 1 is a side elevation of a rake made in accordance with my invention, the cleaner plate being shown in its normal upper position. Fig. 2 is a side elevation, showing the cleaner plate moved to its lower position to strip the material from the rake teeth. Fig. 3 is a detail section, showing the sliding sleeve, the inclosed spring and the manner of mounting the connecting rod to the rake handle. Fig. 4 is a sectional view on the line 4—4 of Fig. 3. Fig. 5 is a perspective view of the cleaner plate, showing the rake head in dotted lines.

Referring to the drawing, the numeral 1 designates the rake head provided with a cross bar 2 and a series of backwardly curved teeth 3. The head 1 is secured to a handle 4. The cleaner consists of a plate 5 provided with a series of perforations 6 through which the teeth 3 of the rake project. The plate 5 is angular in cross section and is provided with an upwardly extending flange 5ª. Connected to the cleaner plate 5 are the backwardly extending braces 7 which at their rear ends are provided with upwardly projecting lugs 8. The cleaner is pivoted to the rake head 1 by means of a pin 9 extending through the rake head and through the inner ends of the braces 7.

For operating the cleaner a connecting rod 10 is pivotally mounted between the lugs 8 upon a pin 11, said connecting rod extending backward through a groove 12 formed in the rake handle 4. The end of the connecting rod 10 is bent upward, as at 13, and a spiral spring 14 surrounds the handle at this point and bears at one end against the bent end 13 of the connecting rod 10. The opposite end of the spring 14 bears against a collar 15 secured upon the rake handle 4. Inclosing the spring, the collar and the end of the connecting rod is a sliding sleeve 16, said sleeve having a shoulder 17 which bears against the upturned end 13 of the connecting rod and against the spring 14. The end 13 of the rod 10 extends through a hole in the sleeve 16.

The operation of my invention may be briefly described as follows:—As the operator takes the rake in his hands, casting it forward, one hand remains at the end of the handle while he uses the other as a slide in a downward course during the backward pull. The lower sliding hand comes in contact with the sliding sleeve 16 at the end of the stroke. This sleeve is moved to push forward, through the groove 12 of the handle 4, the connecting rod 10 moving the cleaner 5 downward over the teeth 3 of the rake.

From the foregoing it will be obvious that my rake cleaner is of simple construction, can be manufactured at reasonable cost, is easy to operate, and will keep the rake clean at all times.

I claim:—

1. A self-cleaning rake comprising a rake head, a perforated cleaner plate pivotally mounted upon the head, a connecting rod pivoted to the cleaner, a spring surrounding the handle, said connecting rod bearing against the spring, and a sliding sleeve for operating the cleaning plate, said sleeve encircling the spring.

2. A self-cleaning rake comprising a cleaner plate provided with perforations through which the rake teeth project, said cleaner being pivoted to the rake head, a connecting rod pivoted to the cleaner, and a sliding sleeve mounted on the handle and inclosing a spiral spring for moving the connecting rod in one direction.

In testimony whereof I affix my signature in presence of two witnesses.

FREDERICK WILLIAM WIEMAN

Witnesses:
R. MORRISON,
JOHN LARDIN.